United States Patent [19]

Sekmakas

[11] 3,963,663
[45] June 15, 1976

[54] ELECTRODEPOSITION OF THERMOSETTING COATINGS AT THE CATHODE

[75] Inventor: Kazys Sekmakas, Chicago, Ill.

[73] Assignee: DeSoto, Inc., Des Plaines, Ill.

[22] Filed: Apr. 26, 1974

[21] Appl. No.: 464,411

[52] U.S. Cl. .............................. 260/29.3; 204/181; 260/72 B; 260/77.5 R
[51] Int. Cl.² ........................................ C08L 61/06
[58] Field of Search ........................... 260/29.3, 831

[56] References Cited
UNITED STATES PATENTS

| | | | |
|---|---|---|---|
| 3,438,940 | 4/1969 | Keberle et al. | 260/29.3 |
| 3,624,178 | 11/1971 | Allscheil et al. | 260/831 |
| 3,729,435 | 4/1973 | Bachmann et al. | 260/29.3 |

*Primary Examiner*—Murray Tillman
*Assistant Examiner*—J. Ziegler
*Attorney, Agent, or Firm*—Dressler, Goldsmith, Clement & Gordon, Ltd.

[57] ABSTRACT

Thermosetting coatings which cure to provide exceptionally corrosion resistant coatings are deposited at the cathode by combining a water dispersible salt of an acid with certain polyamine resins with a water dispersible heat-hardening phenolic resin. The polyamine resin is hydroxy functional and it contains diprimary amine adducted with the epoxy groups of an epoxy urethane. These polyamines provide aqueous electrocoating baths having a pH in the range of 5–7.5.

14 Claims, No Drawings

ELECTRODEPOSITION OF THERMOSETTING COATINGS AT THE CATHODE

The present invention relates to the electrodeposition at the cathode of thermosetting coatings which cure to provide exceptionally corrosion resistant coatings.

Electrodeposition of thermosetting coatings from aqueous medium onto the anode is well known, but the achievement of hard, adherent, flexible and corrosion resistant coatings has resisted the art. High gloss has also been difficult to obtain. The art has sought to avoid the difficulties inherent in anodic deposition by employing aqueous systems which electrodeposit at the cathode, but considerable difficulty has been encountered as a result of which cathodic electrodeposition has not succeeded in displacing anodic electrodeposition in commerce.

In anodic electrodeposition, an acidic resin is electrodeposited and any residual acidity in the resin reduces its corrosion resistance. Further, metal ions from the anode are trapped within the film and they also adversely affect properties, especially corrosion resistance. Also, great hardness in a flexible and impact resistant adherent film has not been obtained.

The corresponding cathodic systems vary from the anodic systems essentially in that amine functionality replaces the acid functionality, and a salt is formed with an acid instead of with a base. The amine resin in salt form disperses in the aqueous bath and dissociates to form a polycationic resin which responds to a unidirectional electrical current by depositing at the cathode as a water insoluble amine resin. Aminoplast resin is codeposited with the amine resin in normal fashion and baked and interesting films are obtained in this way. Still, the properties are limited, and the cathodic systems have been unable to replace the anodic systems.

In my prior application Ser. No. 337,007, filed Mar. 1, 1973 now U.S. Pat. No. 3,896,017, I attacked these problems by precondensing a polyamine resin with a water dispersible heat-hardening phenolic resin, and considerable progress was made in this way. However, the polyamine resins which were utilized were produced by reaction between an epoxy resin with a monosecondary amine as described more fully in my prior applications Ser. No. 162,659, filed July 14, 1971 now U.S. Pat. No. 3,804,786; and Ser. No. 239,305, filed Mar. 29, 1972 now U.S. Pat. No. 3,891,527.

Unfortunately, the water solubility properties obtained utilizing salts of the polyamine resins prepared by reaction with monosecondary amine as previously described has been inadequate and the pH of electrocoating baths made from the same has been lower than desired. These low pH baths are corrosive and damage metal parts, such as pipes, pumps, and other equipment. While it is possible to use plastic pieces and stainless steel to mitigate these corrosion problems, it is preferable to provide electrocoating baths of higher pH which will deposit coatings containing the same desirable properties.

In this invention, an hydroxy functional polyepoxide, preferably a diepoxide is adducted with diisocyanate in a molar ratio of about 2 mols of the polyepoxide per mol of diisocyanate to provide an epoxy urethane containing unreacted epoxy groups. This epoxy urethane is then adducted with a diprimary amine in an amount to provide 1 mol of the diprimary amine per epoxy equivalent. In this way, the epoxy functionality is eliminated, extensive hydroxy functionality is generated, and the product contains a high amine functionality. This hydroxy functional polyamine is then desirably precondensed with phenolic resin and employed in cathodic electrocoating as described in my prior application Ser. No. 337,007, filed Mar. 1, 1973. However, these new polyamines and the condensates thereof with phenolic resins are soluble in water with the aid of an acid at a higher pH and are hence less corrosive. The electrocoat properties are excellent and corrosion resistance is particularly outstanding.

Referring first to the hydroxy functonal polyepoxide, diepoxides are preferred. However, commercial epoxy resins are sometimes mixtures of diepoxides and monoepoxides, and these can be used so long as the epoxy functionality is at least about 1.4. Polyepoxides having an epoxy functionality above about 2.0 can be used, but are not preferred because these are more complex and must be used with care to avoid undesired gelation.

The polyepoxides which are preferred are resinous polyepoxides having a linear aromatic backbone and a molecular weight in the range of from about 600 to about 6000, preferably about 800 to about 4000. These include a significant hydroxy value (equivalents per 100 grams) of from about 0.2 to about 0.4 enabling direct reaction with diisocyanate and providing sufficient resinification to provide good film forming properties in the absence of fatty acid plasticization. These polyepoxides are more preferably diglycidyl ethers of bisphenols such as bisphenol A, and have a 1,2-epoxy equivalency of 1.4 to 2.0.

The reaction of organic diisocyanate with the hydroxy functional polyepoxide is a low temperature addition reaction which can be carried out to completely consume the isocyanate functionality in the production of an epoxy functional polyuethane without gelation.

The organic diisocyanates are illustrated by the conventional toluene diisocyanates including mixed isomers thereof. While the invention will be illustrated by the use of toluene diisocyanate, the invention is not so limited. Indeed, the class of organic diisocyanates is a well known one, including aromatic diisocyanates as illustrated above and aliphatic diisocyanates as noted below. All of these are solvent soluble and the isocyanate group is the sole reactive group therein.

Aliphatic diisocyanates are useful. When these are used, the aliphatic portion of the compound is preferably a divalent hydrocarbon radical containing at least 6 carbon atoms, preferaly more than 10 carbon atoms, and up to about 22 carbon atoms. The hydrocarbon group may be straight, branched, or cyclic since all of these are useful in the practice of the invention. The diisocyanates are required in this invention since higher functional compounds are troublesome with respect to gelation and water dispersibility.

Examples of aliphatic diisocyanates which may be used include dicyclohexane-4,4'-diisocyanate, tetramethylene diisocyanate, hexamethylene diisocyanate, and the like. Especially desirable is 4,4'-methylenebis(-cyclohexyl isocyanate) which is a cycloaliphatic compound. Also useful are the diisocyanates based on fatty acid dimers such as that produced by dimerizing a $C_{18}$ fatty acid to obtain an aliphatic diisocyanate based on a 36 carbon divalent hydrocarbon radical. Branched chain diisocyanates are illustrated by 2-ethyl hexane 1,6-diisocyanate.

The proportion of diisocyanate is important. It is used in stoichiometric deficiency with respect to hydroxy and it is employed in a molar ratio of about 1 mol of diisocyanate for every two mols of polyepoxide. In this way, almost all of the polyepoxide is converted into a dimer through urethane formation. This dimer contains twice the epoxy functionality of the original polyepoxide, and it possesses higher molecular weight and urethane groups providing superior physical and chemical properties in the final coating.

If too little diisocyanate is used, then some of the polyepoxide will remain unreacted. Correspondingly, if too much diisocyanate is used, then molecular weight begins to rise and some gelation may be encountered. Hence, by about a molar ratio of 1:2, I mean a ratio of from 0.8:2 to 1.1:2.

The reaction with diisocyanate must precede the reaction with the diprimary amine. The diisocyanate reaction is carried out by simply cooking the epoxy resin and the diisocyanate together at moderate temperature, preferably with the two in solution in an inert and anhydrous organic solvent.

Any organic diprimary amine may be used in this invention, it being understood that no other functionality is present. It is preferred to use aliphatic diamines derived from glycols, such as polypropylene glycol. These have the formula:

where $x$ is a number from 1 to 50, preferably from 2.5–20.

Again, the reaction is carried out by simply cooking the epoxy urethane intermediate with the diprimary amine, there being no by-products from the simple adduction reaction.

It is necessary to use about 1 mol of the diamine per equivalent of epoxy functionality since it is desired to consume substantially all of the epoxy groups in the epoxy urethane while, at the same time, avoiding any significant proportion of unreacted diamine and also minimizing undesired cross-linking and chain growth. Thus, the term about identifies with plus or minus 5 percent the stoichiometry designated. Preferably, one employs the stoichiometric amount within 2 percent, and this 2 percent possible variation is embraced within the term "substantially."

The diamines based on polyoxyalkylene glycols containing from 2–30 ether groups provide the best solubility characteristics.

The result of the foregoing is a solvent soluble hydroxy functional resin containing a high amine functionality and which is free of undesired epoxy functionality. It is highly soluble in water with the aid of an acid, and it can be coupled through its hydroxy functionality with a water dispersible phenolic resin.

While the phenolic resin can be omitted, its use is important since the composite responds more favorably to baking providing a superior cure in comparison with the conventionally used aminoplast resins.

From the standpoint of the chemistry involved, the acidic resins which are deposited at the anode contain acid groups which function to catalyze the aminoplast cure. In contrast, the amine resins which are deposited at the cathode contain amine groups which function to retard the aminoplast cure.

In this invention, the amine groups do not retard the cure of the codeposited phenolic resin.

As pointed out in my prior application Ser. No. 337,007, from 2 to 60 percent, preferably from 5 to 50 percent, based on the total weight of resin in the system, is constituted by a water soluble or dispersible heat-hardening phenol-formaldehyde resin, commonly termed a phenolic resin. These phenolic resins are illustrated by the well known nongelled alkaline condensates of phenol with excess formaldehyde known as A-stage resols. The conventional reaction is carried out in the presence of a basic catalyst under moderate conditions of elevated temperature and for a limited period of time so as to avoid gelation of the resin.

In the conventional cathodic electrodeposition using the aminoplast resins normally employed, the aminoplast resins, since they contain numerous nitrogen atoms, are electrophoretically propelled toward the cathode in the acidic electrocoating bath by the unidirectional electrical current which is employed. With the heat-hardening water soluble or dispersible phenolic resins used herein, these do not include nitrogen atoms and they do not, per se, have any strong tendency to migrate toward the cathode.

In order to accentuate the desired electrophoretic movement, the water dispersible heat-hardening phenolic resin is heat reacted with the polyamine resin to cause a precondensation to take place, and the two resins to become fully compatibilized with one another. The fact of reaction is easily observed by the increase in viscosity which takes place as the condensation reaction progresses. The by products of the reaction can also be collected and measured to gauge the extent of reaction. These by products are a mixture of water and water miscible organic solvent.

This precondensate of the heat-hardening phenolic resin with the polyamine resin not only provides an efficient basis for coelectrodeposition, but it also enhances the speed of ultimate cure.

The polyamine resins which are the subject of this invention are hydroxy functional, the hydroxy groups of the polyamine resin entering into the desired curing reaction with the methylol group carried by the phenolic resin.

The resins which are dispersed in the electrocoating bath are desirably obtained and employed in the form of a solution in water miscible organic solvent, the solvent being desirably present in an amount of at least 10 percent by weight, based on the weight of the resins which are dispersed in the water phase. These water miscible solvents are preferably present in an amount not in excess of 150 percent, based on the weight of the dispersed resins. The solvent is most desirably present in an amount of from 75 – 125percent, on the same basis. The class of water miscible organic solvents useful herein is well known, and these are illustrated in the accompanying examples.

From the standpoint of water solutions, it will be appreciated that the polyamine resins and the phenolic condensates therewith are dispersed in water with the aid of an acid which solubilizes the resin, the specific nature of the acid being of secondary significance. Inorganic acids such as hydrochloric acid or sulfuric acid are useful, though these do not provide the approximately neutral pH and noncorrosive environment which is preferred. It is presently preferred to employ organic acids such as formic acid, acetic acid, lactic acid or 2-pyridine carboxylic acid. Propionic acid and butyric acid are also useful. The preferred solubilizing acids can be characterized as saturated monocarboxylic acids having a dissociation constant in the range of from about 3.0 to about 5.6.

In the preferred practice of this invention, the final water solution is desired to have a pH in the range of 5–7.5, more preferably pH 5.5–7. When corrosion resistant equipment is available, lower pH can be tolerated.

Neutralization with acid in this invention is from 50 to 100 percent of the amine groups, preferably from 60 to 80 percent.

The aqueous electrocoating bath is normally formulated to have a resin solids content in the range of 2–20 percent, preferably 5–15percent, and the electrodeposited films are baked to cure the same, baking temperatures of 250°to 600°F. for periods varying from about 20 seconds at the highest temperature to about an hour at the lowest temperature being conventional. Preferred bakes are from 325°to 450°F. for from about 2 to 40 minutes.

The invention is illustrated in the following examples in which all parts are by weight unless otherwise indicated.

Example

Part A
Epoxy-Urethane
Charge Composition (Grams)

| | |
|---|---|
| 800 — | Diglycidyl ether of bisphenol A, molecular weight 1000, epoxide equivalent weight 500 (note 1) |
| 200 — | Methyl ethyl ketone. |

Heat the above to 90°C. to dissolve the same. Then add 24 grams toluene diisocyanate (note 2) over a period of 15 minutes. Hold for 90 minutes to complete reaction. Then add an additional 100 grams of methyl ethyl ketone to provide a product having the following characteristics:

| | | |
|---|---|---|
| | Solids: | 73.7% |
| | Viscosity (Gardner) | Y–Z |
| | Color (Gardner) | 2–3 |
| Note 1 — | Epon 1001 may be used. | |
| Note 2 — | Nacconate 80 may be used. | |

Part B
Epoxy-Urethane Diamine Intermediate
Charge Composition (Grams)

| | |
|---|---|
| 180 — | 2-ethoxy ethanol |
| 406 — | Diamine of formula set forth hereinbefore in which x is 5.6 and the average molecular weight is 400 (note 3) |

Charge the above to reactor and heat to 50°C. Then add 700 grams of the resin intermediate produced in Part A, over a 2 hour period while maintaining the temperature at 50°C. Hold for 1 hour at 50°C. Then cool to provide a product having the following characteristics:

| | | |
|---|---|---|
| | Solids: | 71.2% |
| | Viscosity (Gardner) | $Z_3$ |
| | Color (Gardner) | 2 |
| | Acid value | 0.0 |
| Note 3 — | Jeffamine 400 may be used. | |

Part C
Epoxy-Urethane-Diamine Intermediate Condensate
With Water dispersible Phenolic Resin
Charge Composition (Grams)

| | |
|---|---|
| 1,000 — | Part B Intermediate |
| 400 — | 70% solids water soluble heat reactive phenolic (note 4) in 2-butoxy ethanol |
| 300 — | 2-butoxy ethanol |

Charge the above into reactor. Heat to 130°C. Set empty trap. Collect solvents and by-products of reaction (78 cc.). Remove trap, and hold for 2 hours at 130°C. Cool to provide a product having the following final characteristics:

| | |
|---|---|
| Solids | 63.3% |
| Viscosity (Gardner) | V–W |

Note 4 — 210 parts of phenol, 114 parts of paraformaldehyde, 196 parts of deionized water, and 16 parts of diethanol amine are charged to a reactor and heated to 97°C. in 90 minutes, and then cooked for 1 hour. 2-butoxy ethanol is added and water is stripped off to provide a 70 percent solution.

PREPARATION OF WATER SOLUBLE CATIONIC RESIN

Mix 130 grams of the resin of Part C and 3 grams acetic acid. To this mixture add slowly, with fast agitation, 663 grams deionized water.

The polymer dispersed in the water, resulting in a fine colloidal dispersion, having 10 percent solids and a pH of 6.2.

A zinc treated steel panel was used as cathode, and a film was deposited at 80 volts during a 60 second period. The film was baked for 20 minutes at 450°F. and exhibited a pencil hardness of 5H, and excellent flexibility properties. It also exhibited excellent corrosion resistance (in a 5percent salt fog chamber, it passed 750 hours exposure without failure).

The invention is defined in the claims which follow.

I claim:

1. An aqueous coating composition comprising water having dispersed therein an hydroxy functional cationic polyamine resin comprising resinous hydroxy functional polyepoxide having a 1,2-epoxy equivalency of at least about 1.4, said polyepoxide being adducted with a stoichiometric deficiency of diisocyanate with respect to hydroxy and in a molar ratio of diisocyanate to polyepoxide of from 0.8:2 to 1.1:2 to provide an epoxy urethane containing unreacted epoxy groups, said epoxy urethane being adducted with a diprimary amine in which the two primary amine groups are the only functionality present, in an amount of about 1 mol of the diamine per equivalent of epoxy functionality, to consume substantially all of the epoxy functionality of said polyepoxide and generate hydroxy and terminal amine groups, said polyamine resin being condensed with from 2 to 60percent, based on the total weight of resin, of a water dispersible heat-hardening phenol-formaldehyde resin, and said condensed resin being dispersed in said water with the aid of water miscible organic solvent and an acid which solubilizes said resin.

2. An aqueous coating composition as recited in claim 1 in which said polyepoxide is a diglycidyl ether of a bisphenol having a molecular weight in the range of from about 800 to about 4000, and a 1,2-epoxy equivalency of 1.4 to 2.0.

3. An aqueous coating composition as recited in claim 1 in which the molar ratio of diisocyanate to polyepoxide is substantially 1:2.

4. An aqueous coating composition as recited in claim 1 in which said diprimary amine is an aliphatic diamine.

5. An aqueous coating composition as recited in claim 4 in which said diamine has the formula:

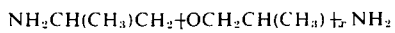

where $x$ is a number from 2.5–20.

6. An aqueous coating composition as recited in claim 1 in which said diprimary amine is used in an amount of substantially 1 mol per epoxy equivalent.

7. An aqueous coating composition as recited in claim 1 in which said dispersion includes from 10–150 percent of water miscible organic solvent, based on resin solids.

8. An aqueous coating composition as recited in claim 1 in which said solubilizing acid is selected from formic acid, acetic acid, lactic acid and 2-pyridine carboxylic acid.

9. An aqueous coating composition as recited in claim 1 in which said phenol-formaldehyde resin is present in an amount of from 5 to 50 percent, based on the total weight of resin.

10. An aqueous coating composition as recited in claim 1 in which said phenol-formaldehyde resin is an A-stage resol.

11. An aqueous coating composition comprising the aqueous coating composition of claim 1 having a solids content of from 2 to 20 percent, and a pH of from 5–7.5.

12. An aqueous coating composition comprising water having dispersed therein at a pH of 5–7.5 and at a solids content of from 2–20 percent, an hydroxy functional cationic polyamine resin condensate comprising resinous hydroxy functional polyepoxide having a 1,2-epoxy equivalency of from 1.4 to 2.0, said polyepoxide being adducted with a stoichiometric deficiency of diisocyanate with respect to hydroxy and in a molar ratio of diisocyanate to polyepoxide of from 0.8:2 to 1.1:2 to provide an epoxy urethane containing unreacted epoxy groups, said epoxy urethane being adducted with a diprimary amine in which the two primary amine groups are the only functionality present in an amount of about 1 mol of the diamine per equivalent of epoxy functionality, to consume substantially all of the epoxy functionality of said polyepoxide and generate hydroxy and terminal amine groups, said polyamine resin being condensed with from 2 to 60 percent, based on the total weight of resin, of a water dispersible heat-hardening phenol-formaldehyde resin, said condensate being dispersed in said water with the aid of from 10–150 percent of water miscible organic solvent, based on resin solids, and an organic carboxylic acid which solubilizes said resin.

13. An aqueous coating composition as recited in claim 12 in which said diprimary amine is aliphatic and based on a polyoxyalkylene glycol containing from 2–30 ether groups.

14. An aqueous coating composition as recited in claim 13 in which said solubilizing acid is used in an amount to neutralize from 50 to 100 percent of the amine groups in said polyamine resin condensate and is a saturated monocarboxylic acid having a dissociation constant in the range of from about 3.0 to about 5.6, said bath having a pH of 5.5–7.

* * * * *